UNITED STATES PATENT OFFICE 2,186,359

COPOLYMERS OF STYRENE AND METHOD OF MAKING THE SAME

Edgar C. Britton, Midland, Mich., and Harry Borden Marshall, Toronto, Ontario, Canada, and Walter J. Le Fevre, Midland, Mich., assignors to The Dow Chemical Company, Midland, Mich., a corporation of Michigan No Drawing. Application February 23, 1938, Serial No. 191,958

20 Claims. (Cl. 260—86)

This invention concerns certain new synthetic resins and a method of making the same. It more particularly concerns the products obtained by polymerizing a mixture of styrene and an unsaturated ether or ester of 1.4-dioxanediol-2.3.

Such ethers and esters are hereinafter termed "modifying agents". They have the general formula:

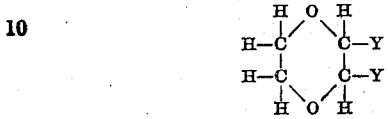

wherein Y is the unsaturated ether or ester radical, which radical contains at least one ethylenic linkage. The ethers having said general formula may also be represented by the sub-generic formula:

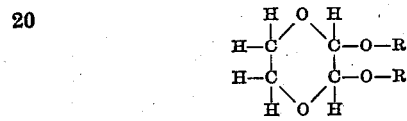

wherein R represents an organic radical containing at least one ethylenic linkage; and the esters which may be employed in the invention have the sub-generic formula:

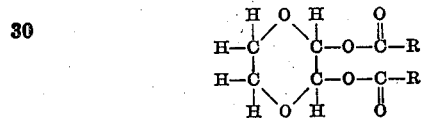

wherein R carries the meaning just stated. Specific examples of such unsaturated ethers and esters are: 2.3-di-methallyloxy-dioxane-1.4; 2.3-di-crotyloxy-dioxane-1.4; 2.3-di-cinnamyloxy-dioxane-1.4; 2.3-di-furfuryloxy-dioxane-1.4; the di-methacrylate of 1.4-dioxanediol-2.3, the di-myristate of 1.4-dioxanediol-2.3; the di-tiglate of 1.4-dioxanediol-2.3; the di-acrylate of 1.4-dioxanediol-2.3; the di-vinylacetate of 1.4-dioxanediol-2.3; etc. These ethers and esters may be prepared by reacting 2.3-dichlorodioxane-1.4 with the necessary unsaturated alcohols or acids.

Our new resins are transparent, glass-like solids, similar to polystyrene in appearance and general physical properties. They vary as regards solubility in aromatic solvents such as benzene, toluene, xylene, etc., from readily soluble resins to resins which are substantially insoluble in, but swell when contacted with, such solvents. The solubility characteristics of the product are dependent upon conditions of preparation hereinafter discussed. All such products may be molded, the procedure usually being that employed in molding other resins, to obtain clear transparent objects which display less tendency then polystyrene itself to blush or craze on standing. All of the new polymers possess excellent dielectric properties and are adapted to use as, or in, electric insulators. They are also adapted to a variety of other uses, such as the preparation of optical lenses; films; varnishes, lacquers, paints and other coating compositions; laminated glass, etc.

The products prepared in accordance with the invention possess a number of characteristics, e. g. decreased solubility in aromatic solvents, gradual increase in molecular weight during their preparation by polymerization, etc., entirely distinct from those of polystyrene itself. They are believed to be co-polymerization products formed by chemical combination of the above mentioned modifying agents with styrene during the polymerization.

The new polymers are obtained by mixing a minor proportion of the modifying agent with styrene, or partially polymerized styrene which is still liquid, and polymerizing the mixture. The polymerization may be carried out in any of the usual ways, e. g., by polymerizing the mixture directly in the presence or absence of added agents such as solvents, polymerization promotors, etc., but the nature of the polymers may vary considerably with changes in the conditions of polymerization. The proportions of styrene and the modifying agent may be varied between wide limits, but the solubility of the product in benzene and/or its tendency to swell when contacted with said solvent decrease as the proportion of modifying agent is increased. For example, the polymer prepared by polymerizing monomeric styrene containing 0.25 per cent of the di-cinnamate of 1.4-dioxanediol-2.3 is fairly soluble in benzene, whereas a similar polymer containing 3.0 per cent of the ester is practically insoluble and swells to only a slight degree. In general, it is preferable to employ between 0.001 and 0.25 part by weight of the modifying agent per part of styrene, since the use of less than 0.1 per cent of the modifying agent leads to the formation of polystyrene-like resins, and the use of more than 25 per cent leads to the formation of soft gum-like polymers.

The variable conditions having greatest influence on the properties of the polymer are the proportion of modifying agent employed, the polymerizing temperature, and the time of polymerization. The employment of polymerization promoters such as benzoyl peroxide, ozone, etc., in considerable proportion may tend to embrittle the products and also to lower the molecular weight of the ultimate products, but such promoters are effective when employed in very small proportion, e. g., 0.25 per cent by weight or less, in which case they have little effect on the properties of the products. Other conditions such as the presence or absence of reaction solvents have little influence on the physical properties of the products, but they may influence the form of the polymer, e. g., the polymerization may be carried out in the presence of an aromatic solvent such as benzene, toluene, etc., to produce the product in the form of a gel which may be precipitated by addition of a non-solvent such as ethanol.

The polymerization occurs slowly, if at all, when the liquid mixture of styrene and the modifying agent is permitted to stand in the dark at room temperature, thus permitting such liquid mixture to be prepared and thereafter shipped in closed containers to the ultimate consumer where it may be polymerized in any desired manner. The liquid mixture may also be stabilized against polymerization by light or moderately elevated temperatures through addition of an inhibitor such as quinone, trinitrobenzene, etc.

Because of the low rate at which the mixture of styrene and the modifying agent polymerizes, it is preferable to accelerate the polymerization by the use of heat, actinic light, or an accelerating agent such as benzoyl peroxide, ozone, strong mineral acid, etc. In practice, the polymerization is usually carried out at temperatures between 50° and 180° C., although still higher temperatures, e. g., 250° C., may be employed if desired. A small proportion, e. g., 0.25 per cent by weight or less, of a polymerization promoter such as benzoyl peroxide may advantageously be employed to accelerate the polymerization.

The solid polymer initially formed at a given temperature is of the type soluble in benzene, but the polymerization may be continued to form ultimate polymers of higher molecular weight which, however, are also usually soluble when the polymerization is carried out at temperatures above approximately 180 C., but which are of the insoluble, swelling type when the polymerization is carried out at temperatures below 180° C. The rate at which such products are formed increases with increase in the proportion of modifying agent present in the mixture. Also, the rate of polymerization increases as the temperature is raised. Accordingly, there are at least three operating conditions, i. e., temperature, time of reaction, and proportion of modifying agent, which may be varied in producing a given polymer of the present type, and considerable flexibility in the conditions for manufacturing the products is permitted.

As hereinbefore stated, the solid polymers obtained when the polymerization is carried out at temperatures between 50° and 180° C. usually are substantially insoluble in benzene but are capable of swelling in the presence of said solvent. The soluble type of polymer is first obtained during such polymerization, but the ultimate product is of the insoluble swelling type. Regardless of the particular temperature at which the polymerization is carried out, the viscosity of the liquid mixture increases until solidification occurs, after which the average molecular weight of the polymer continues to increase until the polymerization is complete. Similar behavior is observed when carrying the polymerization out in aqueous emulsion or solution. For instance, when styrene and one of the hereinbefore mentioned modifying agents are dissolved in benzene or toluene and thereafter polymerized at a given temperature, the solution gradually becomes more viscous until gelatination occurs.

Accordingly, liquid polymeric mixtures of desired viscosity, or solid polymers which, when dissolved in an organic solvent, give solutions of desired viscosity, are readily obtainable when operating in accordance with the invention. Such products are adapted to use in lacquers, varnishes, paints, etc., and they may frequently be employed to obtain films suitable for use in photography or as wrapping materials.

As shown above, the polymerization may be stopped at an intermediate point or continued to completion to obtain a large number of polymerized products varying over a wide range in such characteristics as molecular weight, solubility in benzene, physical appearance, etc. When the polymerization is carried out at elevated temperatures using little or no reaction promoter, it may be interrupted merely by cooling the mixture to room temperature or thereabout, after which further polymerization is not noticeable.

The solid polymers are usually obtained in a form suitable for molding without further purification, but if especially refined products are desired, the initial products may be ground, extracted with a solvent such as ethanol or acetone, and dried to form molding powders. When the polymer is one capable of being swelled, it may be dispersed in an aromatic solvent such as benzene and then precipitated in finely divided form by addition of a non-solvent liquid such as ethanol. As in the case of molded polystyrene itself, the physical properties, e. g., tensile strength, impact strength, etc., of the new resins vary somewhat with the purity of the styrene employed in preparing them.

The following examples will illustrate various ways in which the principle of the invention has been applied, but are not to be construed as limiting the same.

*Example 1*

A mixture of 100 parts of styrene, and 1 part of the di-cinnamate of 1.4-dioxanediol-2.3 may be polymerized to a solid by heating at 160° C. for 20 hours. The polymer is a tough, glasslike resin, capable of being molded, cut, polished, etc. It swells slightly but does not dissolve in benzene, and is insoluble and non-swelling in acetone and ethanol. A similar polymer, prepared by heating the mixture at the same temperature in the presence of 0.25 per cent of benzoyl peroxide, is slightly more brittle than the polymer prepared in the absence of an accelerator.

*Example 2*

A mixture of 400 parts of styrene and 1 part of the di-cinnamate of 1.4-dioxanediol-2.3 is heated at 125° C. for 3 days. The product obtained is ground, washed to remove any unpolymerized material, dried and molded at 170° C. The molded test specimen is a hard, transparent resin which swells slightly in benzene. It has a tensile strength of approximately 7500 lbs./sq. in., an impact strength of approximately 1.0 in. lb. and a Shore scleroscope hardness of about 80.

Example 3

A mixture of 50 parts of styrene and 1 part of the di-furoate of 1.4-dioxanediol-2.3 is polymerized by heating at 140° C. for 40 hours. During the polymerization, the viscosity and molecular weight of the mixture increase gradually. The ultimate solid polymer is a clear resin, soluble in benzene and other aromatic solvents.

Example 4

Pure, monomeric styrene is polymerized to a thick viscous liquid by heating at 125° C. for several hours. A mixture containing 80 grams of the partially polymerized styrene and 2 grams of the di-cinnamate of 1.4-dioxanediol-2.3 is added dropwise with rapid stirring to a solution of 5 grams of an emulsifying agent such as albumin, sodium caseinate, etc., in water. A thick stable emulsion forms which is then polymerized by heating at 100° C. for 6 days. The polymeric product is a soft, white solid, resembling crude rubber in appearance and swelling only slightly in benzene. A molded specimen of this material shows a somewhat lower heat distortion value and is softer than the material prepared by polymerizing a simple mixture of styrene and the modifying agent.

Example 5

A mixture containing 200 parts of styrene and 1 part of the dicinnamate of 1.4-dioxanediol-2.3 is heated at 140° C. for 1 hour. The unpolymerized material is distilled off leaving a colorless solid residue which is slightly soluble in benzene. A polymer prepared by polymerizing a similar initial mixture for 2 hours at 140° C. is insoluble in benzene.

Example 6

A mixture of 50 grams of styrene and 10 grams of the di-crotonate of 1.4-dioxanediol-2.3 is heated at 100° C. for 6 days. The product is a hard, clear resin which swells in benzene but is insoluble in acetone and ethanol. A benzene dispersion of the polymer is poured into ethanol and the polymer precipitates in finely divided form. A test specimen molded at 170° C. has a power factor of approximately 0.05 per cent and a dielectric constant of about 2.65.

Example 7

45 grams of styrene and 5 grams of 2.3-diallyloxy-dioxane-1.4 is heated at 100° C. for 6 days to give a polymeric product which swells to a stiff gel in benzene. A benzene dispersion of the polymer is poured into ethanol and the polymer precipitated. A molded test specimen has a Shore hardness of approximately 74 and a tensile strength greater than 4,000 lbs./sq. in.

Example 8

A mixture of 5 parts of styrene and 1 part of the di-oleate of 1.4-dioxanediol-2.3 as modifying agent is heated at 100°-110° C. for 8 days to give a resinous polymer, soluble in benzene, and having film-forming properties. A similar polymer is obtained employing the di-stearate of 1.4-dioxanediol-2.3 as the modifying agent, but operating otherwise as just described.

Example 9

10 parts of styrene and 1 part of a mixture containing 2.3-dimethallyloxy-dioxane-1.4 and a minor proportion of 2-methallyloxy-3-chloro-dioxane-1.4, prepared by reacting methallyl alcohol with 2.3-dichloro-dioxane-1.4, is heated at 100°-110° C. for 5 days. The resinous polymeric product is soluble in benzene and has a molecular weight of approximately 65,000-70,000.

Example 10

100 parts of styrene and 1 part of the di-(coumarin carboxylate) of 1.4-dioxanediol-2.3 is heated at 100°-110° C. for 5 days. The polymerized product is dispersed in benzene, precipitated with ethanol, and molded at 150° C. The molded specimen is a tough, transparent resin, insoluble in most organic solvents and swelling only slightly in benzene. It shows a tensile strength of approximately 5500 lbs./sq. in. and a heat distortion value of about 90° C.

Example 11

A mixture of 400 parts of styrene and 1 part of the di-cinnamate of dioxanediol-2.3 is heated at 100°-110° C. for 4 days to give a transparent polymer which is soluble in benzene. A polymer prepared from a mixture of 400 parts of styrene and 2 parts of the modifying agent swells but does not dissolve in benzene.

Example 12

A mixture of 100 parts of styrene and 1 part of the di-crotonate of 1.4-dioxanediol-2.3 is dissolved in 100 parts of benzene and heated under reflux for 5 days. The reaction mixture polymerizes to a stiff gel which may be precipitated as a fine white powder with ethanol. A molded specimen of the precipitated polymer is a colorless, transparent resin having good strength and dielectric characteristics.

Example 13

A mixture of styrene which has been partially polymerized by heating at 125° C. for several hours and the di-cinnamate of 1.4-dioxanediol-2.3 is heated at 140° C. for 10 hours. The colorless, resinous polymer swells slightly in benzene but does not dissolve.

The liquid mixture of styrene and a modifying agent hereinbefore described may, if desired, be polymerized in the presence of added agents such as dyes, pigments, or fillers to obtain polymerized products comprising such coloring matter or filler and having properties modified by the presence of such added substances. Also, such addition agents may be incorporated with the solid polymers before molding to produce decorative effects or to modify certain physical properties of the molded product.

Other modes of applying the principle of our invention may be employed instead of those explained, change being made as regards the method herein disclosed or the material employed, provided the step or steps stated by any of the following claims be employed, or the product claimed in any of the following claims be obtained.

We therefore particularly point out and distinctly claim as our invention:

1. The process which comprises polymerizing a mixture of styrene and a dioxane derivative selected from the group consisting of unsaturated esters and unsaturated ethers of 1.4-dioxanediol-2.3 having the general formula:

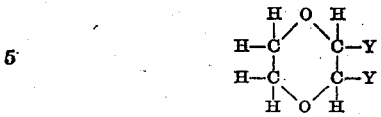

wherein Y represents an unsaturated radical selected from the group consisting of ester and ether radicals containing at least one ethylenic linkage.

2. The process which comprises polymerizing a mixture of styrene and an unsaturated ester of 1.4-dioxanediol-2.3 having the general formula:

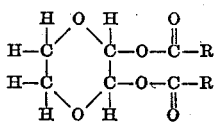

wherein R represents an organic radical containing at least one ethylenic linkage.

3. The process which comprises polymerizing a mixture of styrene and an unsaturated ether of 1.4-dioxanediol-2.3 having the general formula:

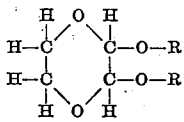

wherein R represents an organic radical containing at least one ethylenic linkage.

4. The process of preparing an insoluble polystyrene composition which comprises heating at a temperature between 50° and 180° C. a mixture of styrene with between 0.1 and 25 per cent of its weight of an unsaturated di-ester of 1.4-dioxanediol-2.3 each ester group of which contains at least one ethylenic linkage.

5. The process of preparing an insoluble polystyrene composition which comprises heating at a temperature between 50° and 180° C. a mixture of styrene with between 0.1 and 25 per cent of its weight of an unsaturated di-ether of 1.4-dioxanediol-2.3 each ether group of which contains at least one ethylenic linkage.

6. The process which comprises polymerizing styrene with between 0.1 and 25 per cent of its weight of the dicinnamate of 1.4-dioxanediol-2.3.

7. The process which comprises polymerizing styrene with between 0.1 and 25 per cent of its weight of the di-crotonate of 1.4-dioxanediol-2.3.

8. The process which comprises polymerizing styrene with between 0.1 and 25 per cent of its weight of 2.3-diallyloxy-dioxane-1.4.

9. The process which comprises polymerizing while in an aqueous emulsion, a mixture of styrene and a dioxane derivative selected from the group consisting of unsaturated esters and unsaturated ethers of 1.4-dioxanediol-2.3 having the general formula:

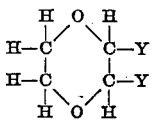

wherein Y represents an unsaturated radical selected from the group consisting of ester and ether radicals containing at least one ethylenic linkage.

10. The process which comprises polymerizing a mixture of partially polymerized styrene and a dioxane derivative selected from the group consisting of unsaturated esters and unsaturated ethers of 1.4-dioxanediol-2.3 having the general formula:

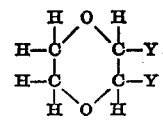

wherein Y represents an unsaturated radical selected from the group consisting of ester and ether radicals containing at least one ethylenic linkage.

11. The process which comprises polymerizing a mixture of styrene and a dioxane derivative selected from the group consisting of unsaturated esters and unsaturated ethers of 1.4-dioxanediol-2.3 having the general formula:

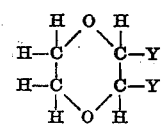

wherein Y represents an unsaturated radical selected from the group consisting of ester and ether radicals containing at least one ethylenic linkage, stopping the polymerization before a solid polymer is formed and distilling off any unpolymerized material.

12. The products of the conjoint polymerization of styrene and a dioxane derivative selected from the group consisting of unsaturated esters and unsaturated ethers of 1.4-dioxanediol-2.3 having the general formula:

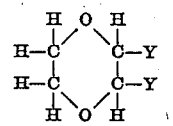

wherein Y represents an unsaturated radical selected from the group consisting of ester and ether radicals containing at least one ethylenic linkage.

13. The products of the conjoint polymerization of styrene and an unsaturated ester of 1.4-dioxanediol-2.3 having the general formula:

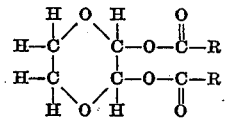

wherein R represents an organic radical containing at least one ethylenic linkage.

14. The products of the conjoint polymerization of styrene and an unsaturated ether of 1.4-dioxanediol-2.3 having the general formula:

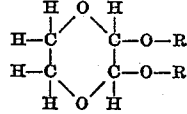

wherein R represents an organic radical containing at least one ethylenic linkage.

15. The products of the conjoint polymerization of styrene and the di-cinnamate of 1.4-dioxanediol-2.3.

16. The products of the conjoint polymerization of styrene and the di-crotonate of 1.4-dioxanediol-2.3.

17. The products of the conjoint polymerization of styrene and 2.3-diallyloxy-dioxanediol-1.4.

18. A synthetic resin prepared by polymerizing while in an aqueous emulsion a mixture of styrene and a dioxane derivative selected from the group consisting of unsaturated esters and unsaturated ethers of 1.4-dioxanediol-2.3 having the general formula:

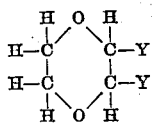

wherein Y represents an unsaturated radical selected from the group consisting of ester and ether radicals containing at least one ethylenic linkage.

19. A synthetic resin prepared by polymerizing a mixture of partially polymerized styrene and a dioxane derivative selected from the group consisting of unsaturated esters and unsaturated ethers of 1.4-dioxanediol-2.3 having the general formula:

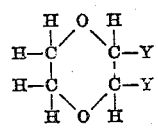

wherein Y represents an unsaturated radical selected from the group consisting of ester and ether radicals containing at least one ethylenic linkage.

20. A synthetic resin prepared by heating at a temperature between about 50° C. and about 180° C. a mixture of styrene and between about 0.1 and about 25 per cent of its weight of a dioxane derivative selected from the group consisting of unsaturated esters and unsaturated ethers of 1.4-dioxanediol-2.3 having the general formula:

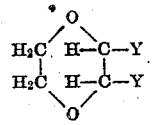

wherein Y represents an unsaturated radical selected from the group consisting of ester and ether radicals containing at least one ethylenic linkage.

EDGAR C. BRITTON.
WALTER J. LE FEVRE.
HARRY BORDEN MARSHALL.